(12) United States Patent
Gillengerten

(10) Patent No.: US 10,465,751 B2
(45) Date of Patent: Nov. 5, 2019

(54) ROTATING CONDUIT JOINTS

(71) Applicant: Alan Robert Gillengerten, Oceanside, CA (US)

(72) Inventor: Alan Robert Gillengerten, Oceanside, CA (US)

( * ) Notice: Subject to any disclaimer, the term of this patent is extended or adjusted under 35 U.S.C. 154(b) by 0 days.

(21) Appl. No.: 15/231,140

(22) Filed: Aug. 8, 2016

(65) Prior Publication Data

US 2017/0321753 A1 Nov. 9, 2017

Related U.S. Application Data

(60) Provisional application No. 62/333,533, filed on May 9, 2016.

(51) Int. Cl.
| | | |
|---|---|---|
| *F16C 19/06* | (2006.01) | |
| *F16C 35/06* | (2006.01) | |
| *F16L 27/08* | (2006.01) | |
| *F16C 35/067* | (2006.01) | |
| *F16C 35/063* | (2006.01) | |

(52) U.S. Cl.
CPC ............ *F16C 35/067* (2013.01); *F16C 19/06* (2013.01); *F16C 35/063* (2013.01); *F16L 27/0828* (2013.01); *F16C 2226/62* (2013.01)

(58) Field of Classification Search
CPC .............. F16C 2226/60; F16C 2226/62; F16C 35/063; F16C 35/0635; F16C 19/04; F16C 19/06; F16C 19/24; F16C 19/26; F16C 35/067; F16L 27/0824; F16L 27/0828
See application file for complete search history.

(56) References Cited

U.S. PATENT DOCUMENTS

| | | | | |
|---|---|---|---|---|
| 449,958 A | * | 4/1891 | Simonds | F16C 35/063 384/515 |
| 632,878 A | * | 9/1899 | McGuire | F16C 25/06 29/898.07 |
| 853,225 A | * | 5/1907 | Coldwell | F16C 35/063 384/540 |
| 872,883 A | * | 12/1907 | Adams | F16C 35/063 403/261 |
| 936,739 A | * | 10/1909 | Randall | F16C 33/14 384/285 |
| 2,459,981 A | * | 1/1949 | Warren | F16L 27/0828 277/574 |
| RE23,283 E | * | 10/1950 | Browne | F16J 15/54 285/98 |

(Continued)

FOREIGN PATENT DOCUMENTS

| | | | | | |
|---|---|---|---|---|---|
| DE | | 862533 C | * | 1/1953 | .......... F16L 27/0824 |
| JP | | 2007055438 A | * | 3/2007 | ............ F16C 35/063 |

OTHER PUBLICATIONS

Machine Translation of DE 862533 dated Jan. 1953.*

*Primary Examiner* — Alan B Waits
(74) *Attorney, Agent, or Firm* — Patent Law & Venture Gp.; Gene Scott

(57) ABSTRACT

A rotating conduit joint has a pair of conduits engaged with a bearing set. The bearing set has an outer race an inner race separated by ball bearings. The conduits have clearance holes aligned with radial holes in the races. Screw fasteners are engaged with the clearance holes and radial holes to secure the conduits to the bearing set in mutual rotation. The radial holes may be filled with a lubricant. Furthermore, the radial holes may be of constant diameter, conical, or threaded and may be open to the ball bearings to deliver the lubricant to the ball bearings.

2 Claims, 4 Drawing Sheets

(56) References Cited

U.S. PATENT DOCUMENTS

| | | | | |
|---|---|---|---|---|
| 2,549,951 A | * | 4/1951 | Warren | F16L 27/0828 |
| | | | | 285/226 |
| 2,553,337 A | * | 5/1951 | Shafer | F16C 23/084 |
| | | | | 384/541 |
| 2,884,661 A | * | 5/1959 | Hurley | B29C 45/14 |
| | | | | 249/88 |
| 3,361,501 A | * | 1/1968 | Messinger | F16C 19/362 |
| | | | | 384/620 |
| 3,462,174 A | * | 8/1969 | Raley | B29C 47/0026 |
| | | | | 285/14 |
| 3,468,564 A | * | 9/1969 | Frohlich | F16L 27/08 |
| | | | | 285/111 |
| 3,517,952 A | * | 6/1970 | McCracken | F16L 27/0824 |
| | | | | 277/500 |
| 3,649,056 A | * | 3/1972 | Frohlich | F16L 27/0824 |
| | | | | 285/276 |
| 3,679,235 A | * | 7/1972 | Faccou | F16L 27/0824 |
| | | | | 285/14 |
| 3,685,116 A | * | 8/1972 | Neuman | B23P 11/005 |
| | | | | 29/243.5 |
| 4,944,535 A | * | 7/1990 | Maupin | F16L 27/0816 |
| | | | | 285/16 |
| 8,322,928 B2 | * | 12/2012 | Larsen | F03D 7/0224 |
| | | | | 290/55 |
| 8,783,733 B2 | * | 7/2014 | Tausch | F16J 15/025 |
| | | | | 285/276 |
| 8,944,692 B2 | * | 2/2015 | Hori | F03D 7/0204 |
| | | | | 384/507 |
| 2002/0043803 A1 | * | 4/2002 | Kietzmann | F16L 27/0824 |
| | | | | 285/276 |
| 2006/0291764 A1 | * | 12/2006 | Ravindra | F16D 1/0847 |
| | | | | 384/541 |

\* cited by examiner

ROTATING CONDUIT JOINTS

PRIOR APPLICATIONS

This application, being filed within one year of the filing date of provisional patent application U.S. 62/333,553 filed on May, 9, 2016 claims priority thereto and subject matter thereof is incorporated hereinto in its entirety.

FIELD OF THE DISCLOSURE

The field of this disclosure includes fluid conduits with rotating joints and in particular joints that enable effective and efficient bearing lubrication and replacement.

BACKGROUND

Flat concentric bearing sets with inner and outer races and either ball or roller bearings are well known. The purpose of such bearing sets is to reduce rotational friction and to support radial and axial loads. They achieve this by using at least two races to secure rolling elements and transmit loads from one element to another. In most applications, one race is stationary and the other is attached to a rotating member, e.g., a hub, tube, or shaft. As one of the bearing races rotates it causes balls or rollers to rotate as well. Because these elements are rolling they have a lower coefficient of friction than that of members which slide against each other. Ball bearings tend to have lower load capacity for their size than other kinds of rolling-element bearings due to the smaller contact area between the balls and races. Also, they cannot tolerate some misalignment between the inner and outer races. Roller bearings, of course, can handle heavier loads. Bearing assemblies may tend to run dry if not frequently lubricated. Bearings are typically press fit into the mechanical parts they support but may be attached in other ways in accordance with published handbooks and manuals such as the well-known and regarded Timken Engineering Manual. Although lubricating materials and applications have improved greatly, bearing used in harsh environments still require occasional lubrication and although bearing surfaces may be durable, bearing replacement is still frequently necessary. This may present a problem depending on the manner of assembling bearing sets into mechanisms and apparatus.

SUMMARY

In view of the foregoing, a bearing set according to the following description and illustrations can be lubricated without disassembly. In the case of a bearing set having inner and outer concentric races, lubrication may be accomplished by inserting lubricating materials through radial holes in the outer race. Such holes may also be used for improved mounting and dismounting of bearing sets in equipment.

These and other aspects of embodiments herein described will be better appreciated when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Embodiments of the described apparatus are illustrated only as examples in the figures of the accompanying drawing sheets wherein the same reference numeral refers to the same element as it may appear in multiple drawing sheets.

DETAILED DESCRIPTION

Figure 1:
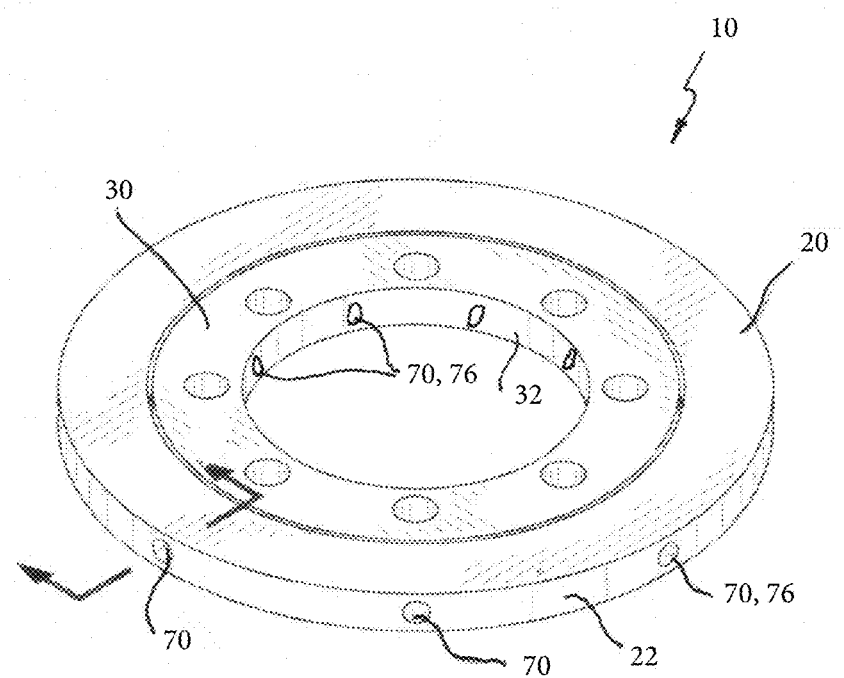
FIG. 1 is a perspective view of a flat, concentric bearing assembly.
Figure 3:
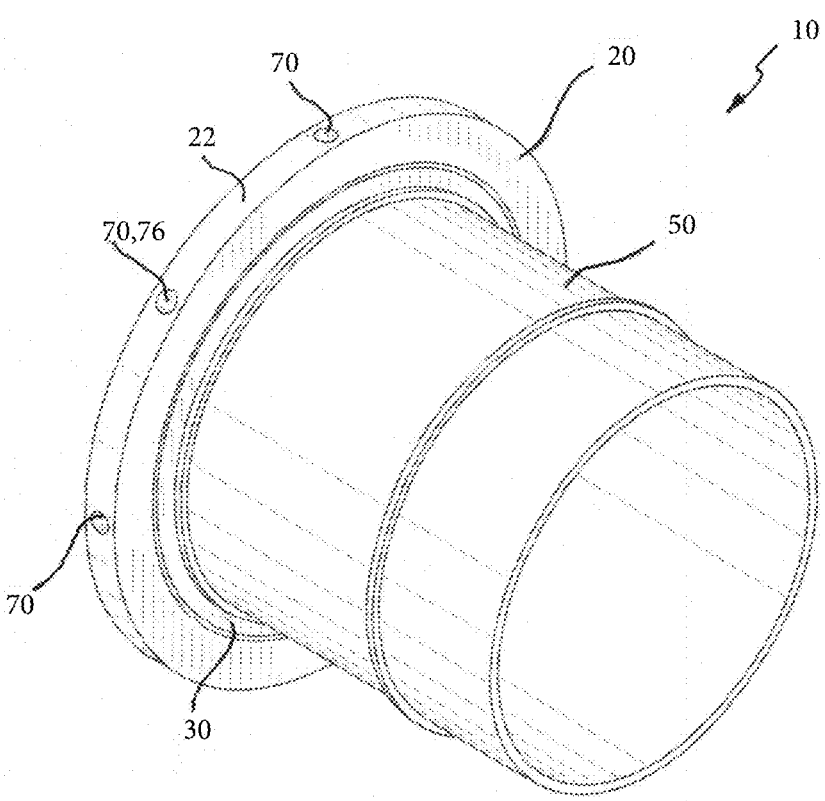
FIG. 3 is a perspective view thereof as mounted on a tubular conduit.
Figure 2:
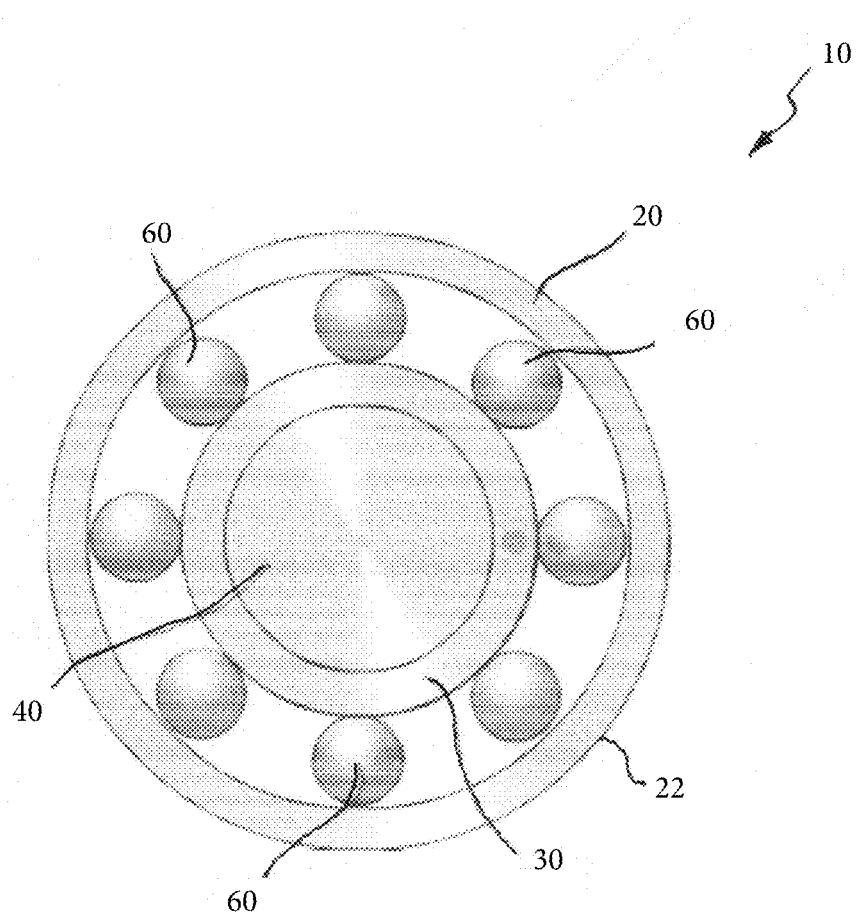
FIG. 2 is a side view thereof with portions removed for clarity and shown mounted on a solid central shaft.

Rotating conduit joints in accordance with this description and attached drawing figures may enable simple bearing lubrication and replacement providing an important improvement over the prior art. An example of a circular bearing set 10 is shown in FIGS. 1 and 2. A typical bearing set of this type may have an outer bearing race 20 and an inner bearing race 30 as shown. Inner bearing race 30 may be mounted on a solid shaft 40 as shown in FIG. 2 or may receive a tubular conduit 50 in mutual coaxial engagement as shown in FIG. 3. Ball bearings 60 are typically fitted between outer 20 and inner 30 races and function to allow rotation of one race relative to the other race while transferring forces between them as is very well known in bearing technology.

Figure 4:
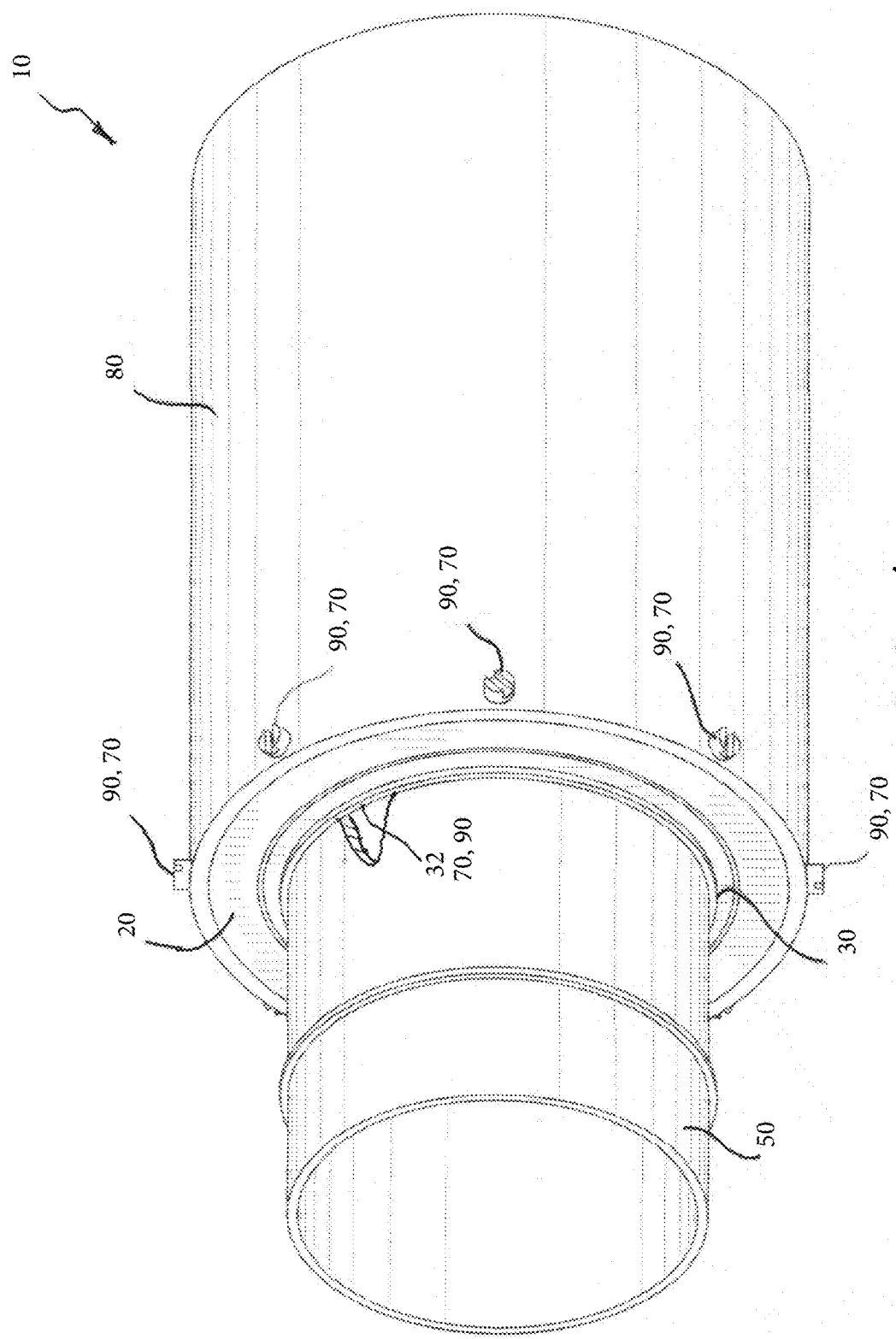
FIG. 4 is a perspective view thereof as further mounted within a tubular housing.

Referring to FIG. 1 it is shown that the outside circular edge 22 of outer race 20 may be penetrated by angularly spaced-apart radial holes 70 and the inner circular edge 32 of inner race 30 may also be so penetrated as shown in FIGS. 1 and 4. Such holes are quite useful as will be described.

Outer bearing race 20 may be coaxially engaged with a tubular conduit 80 as shown in FIG. 4. Solid rod 40, and tubular conduits 50, 80 each may be engaged with bearing races 20 or 30 using sweat joints, interference fits, friction fits, by the use of adhesives or bonding agents, or by other means as is currently known in the field of mechanics. When bearings are subject to high or low temperature or pressure or when operated in caustic environments, frequent re-lubrication or bearing replacement may be required. There are two problems with such conventional joints, however in that they require special tools and fixtures to engage and also to disengage the parts, and also they require disassembly in order to provide bearing lubrication. These are costly and time consuming approaches. The present invention provides a simple and cost-effective alternative to such conventional parts and procedures.

Figure 5A:
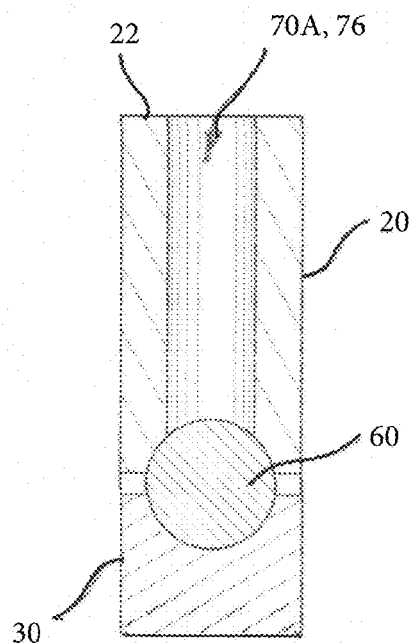
FIG. 5A is a section view taken along cutting plane line 5-5 in FIG. 1 showing a radial lubrication channel.
Figure 5B:
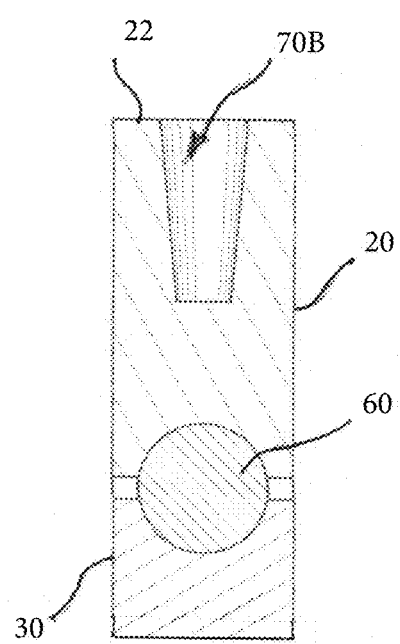
FIG. 5B is a section view taken along cutting plane line 5-5 in FIG. 1 showing a tapered radial blind hole.
Figure 5C:
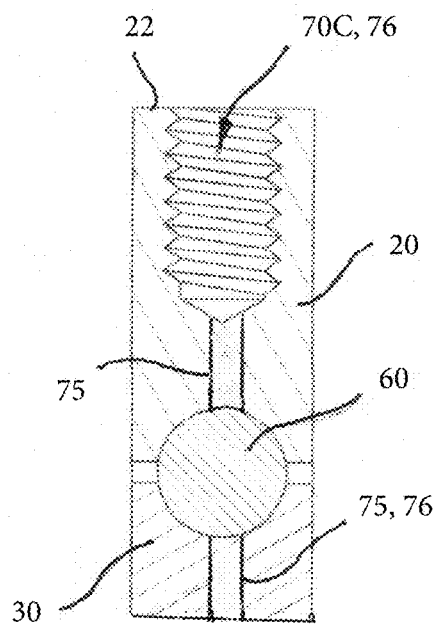
FIG. 5C is a section view taken along cutting plane line 5-5 in FIG. 1 showing a tapped radial hole.

Referring now to FIGS. 5A, 5B, and 5C it is shown that holes 70 (FIG. 1) may be of several types. In FIG. 5A hole 70A is a straight channel extending from outer circular surface 22 of outer race 20 to ball bearing 60. Hole 70A may be used to introduce a lubricant to the bearing surface. Such a lubricant may be a stiff grease or a heavy oil. Hole 70A may have a diameter that is about one-half that of bearing 60, as shown, so that it is able to hold a sufficient quantity of grease or oil 76 as a store for long-term continuous lubrication. Alternately, hole 70A may receive a straight pin inserted therein (not shown) through matching clearance holes in outer race 20 to conduit 80. Such a straight pin may be a force fit or a friction fit, but may be easily removed when necessary. FIG. 5B shows that hole 70B may be conical in shape to receive a conical pin (not shown) to secure outer bearing race 20 to conduit 80 through clearance holes therein. Such a conical pin may be a force fit or a friction fit and its conical shape may better enable such a pin to take up any tolerance mismatch between the clearance hole and conical hole 70B. In FIG. 5C we see that hole 70C may be tapped for receiving a threaded fastener such as screw 90 which is shown in FIG. 4. Tapped hole 70C may also join with a lubrication channel 75 for providing dual service as a means for mechanical joining and also as a means for lubrication.

As shown in FIG. 4 the same mounting and lubricating approaches as described above may be applied at tubular conduit 50 and inner race 30. Holes of types 70A, B, and C may be applied to inner race 30, and obviously it is possible to use such holes for mounting and lubrication as described. In the foregoing manner it can be seen that both tubular conduits 50 and 80 can be securely fastened to bearing set 10 while being easily removed to replace worn bearing set 10 as needed.

The tapped radial holes 70C may extend coaxially into lubrication channels 75, each terminating directly in line with a ball bearing 60 of the bearing set; whereby tapped radial holes 70C and lubricating channels 75 provide dual service, both mechanical joining and lubricating as can be seen in FIG. 5C.

It should be understood that although the present description and illustrations refer to dual race ball bearing assemblies, it is not meant to refer to a limitation as other types of bearing assemblies may be advantageously equipped; as for instance roller bearing sets.

In the foregoing description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

What is claimed is:

1. A rotating conduit joint comprising:
   a pair of conduits engaged with a bearing set, wherein said bearing set has inner and outer races mutually positioned between parallel opposing planes wherein said races are axially coincident;
   wherein said conduits are characterized as having different interior diameters and having clearance holes aligned with tapped radial holes in said bearing set; and wherein;
   threaded fasteners are radially engaged jointly with said clearance holes and said tapped radial holes thereby securing said conduits to said bearing set for mutual rotation of said pair of conduits;
   wherein said tapped radial holes extend coaxially into lubrication channels, said lubricating channels each terminating directly in line with a ball bearing of said bearing set; whereby said tapped radial holes and said lubricating channels provide dual service, both mechanical joining and lubricating.

2. The rotating conduit joint of claim 1 wherein at least one of said radial holes have a lubricant material therein and are positioned to deliver said lubricant material directly onto said ball bearings.

* * * * *